United States Patent [19]
Retzer et al.

[11] Patent Number: 6,009,325
[45] Date of Patent: *Dec. 28, 1999

[54] METHOD OF AND APPARATUS FOR OPERATING A CELLULAR PHONE IN ONE OF TWO MODES

[75] Inventors: Michael Herbert Retzer, Palatine; Manohar Achyut Joglekar, Long Grove, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/382,338

[22] Filed: Feb. 1, 1995

[51] Int. Cl.$^6$ ....................................................... H04Q 7/32
[52] U.S. Cl. ........................ 455/434; 455/466; 455/515; 455/553
[58] Field of Search ..................................... 375/219, 222, 375/223, 305, 274, 336, 224; 455/426, 552, 553, 432, 434, 435, 515, 38.1, 343, 574, 556, 557, 181.1, 458, 186.1, 332, 466, 404; 370/493, 494, 495

[56] References Cited

U.S. PATENT DOCUMENTS

| | | | |
|---|---|---|---|
| 5,420,911 | 5/1995 | Dahlin et al. | 455/553 |
| 5,479,479 | 12/1995 | Braitberg et al. | 455/404 |
| 5,526,398 | 6/1996 | Okada et al. | 455/426 |
| 5,574,750 | 11/1996 | Peponides et al. | 375/224 |
| 5,590,133 | 12/1996 | Billstrom et al. | 455/332 |

*Primary Examiner*—Reinhard J. Eisenzopf
*Assistant Examiner*—Lester G. Kincaid
*Attorney, Agent, or Firm*—John J. King; Daniel R. Collopy

[57] ABSTRACT

A unique method and apparatus automatically switches between a voice mode and a data mode in a wireless communication device. In particular, a communication device (200) adapted to voice and data signals monitors a data network for data traffic for a first predetermined period of time (506), then monitors a cellular control channel (516) for cellular traffic during a sleep mode of the data network before establishing normal cellular operation. The method and apparatus increases efficient use of channel capacity by selectively switching between systems during periods of nonuse. Finally, according to other novel aspects of the present invention, user prompts (606, 618) enable efficient use of a communication device capable of transmitting and receiving both voice and data.

11 Claims, 5 Drawing Sheets

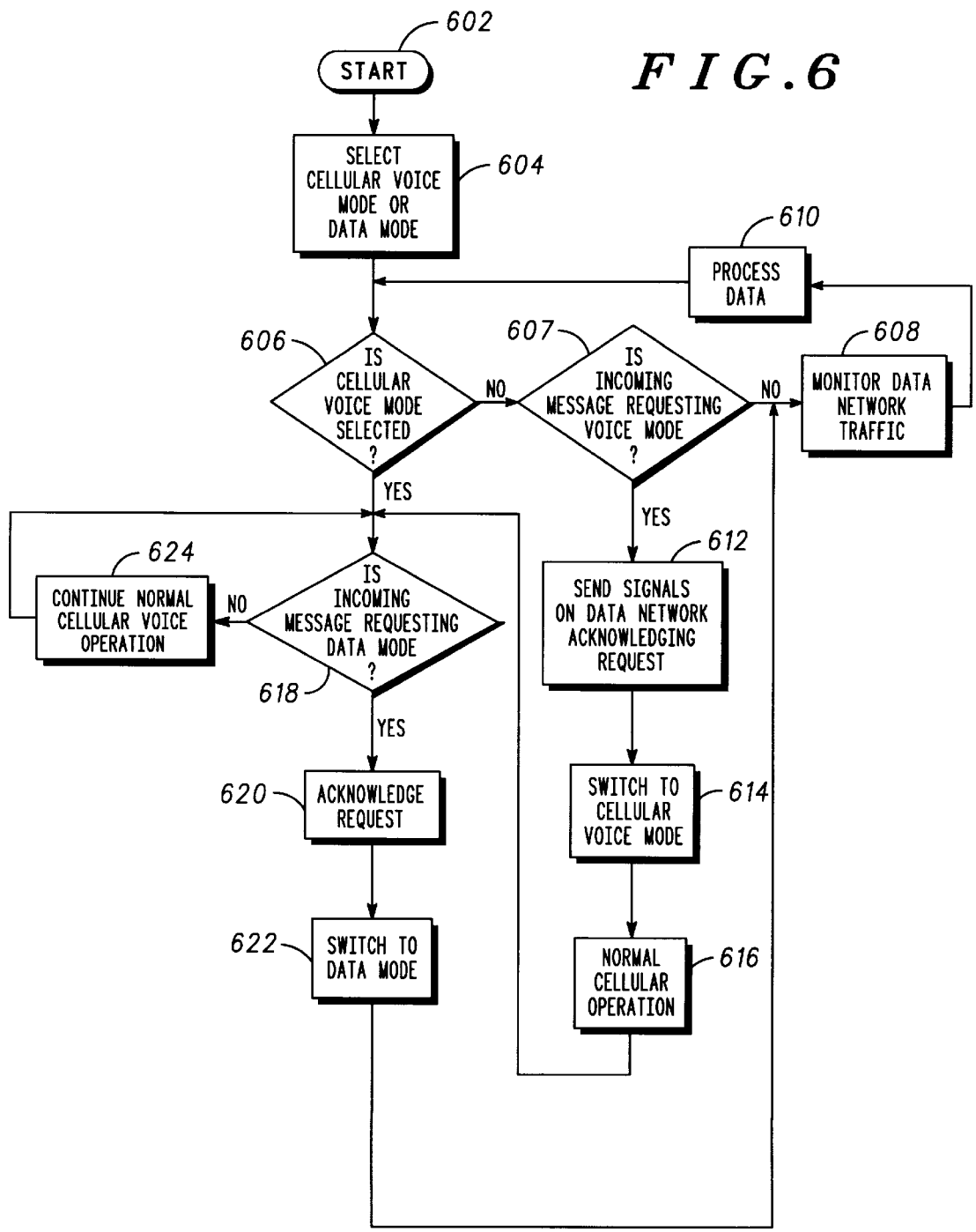

6,009,325

METHOD OF AND APPARATUS FOR OPERATING A CELLULAR PHONE IN ONE OF TWO MODES

FIELD OF THE INVENTION

This application is related to communication systems, and more particularly to a method and apparatus for processing voice and data.

BACKGROUND OF THE INVENTION

The use of wireless communication devices has increased dramatically in recent years. With the increased number of subscribers for wireless communication services, channel availability has become scarce. Considerable effort has been made to increase channel capacity to meet the increased demand. While channel availability has reached capacity at peak periods during which many subscribers occupy channels, excess channel capacity typically exists at off-peak periods, or during other periods of non-use, such as during a handoff.

In response to the excess channel capacity during offpeak periods, systems have been considered for transmitting packet data. One such system is the Cellular Digital Packet Data (CDPD) network contemplated by a number of cellular service providers as set forth in the Cellular Digital Packet Data System Specification, Release 1.0, Jul. 19, 1993 or Release 1.1, Jan. 19, 1995, available from the CDPD Industry Input Coordinator, 650 Town Center Drive, Suite 820, Costa Mesa, Calif. 92626.

Presently, data packets transmitted on a CDPD network are transmitted by way dedicated data equipment, such a stand alone CDPD equipment. While conventional communication devices, such as cellular subscriber equipment, could be modified to include circuitry for transmitting data packets, such communication devices must have a means for switching between the two modes of operation. This could be achieved by having a physical switch or a user selectable mode of operation in the communication device for communicating on a cellular network or transmitting data on a data network. However, such manual switching or selection by the user is not only inconvenient, but also has performance limitations. That is, manual switching does not take advantage of dormant periods of operation in a data network.

Accordingly, there is a need for a method and apparatus for selectively switching between systems of the communication device to efficiently utilize channel capacity. There is a further need for a method and apparatus which automatically switches between the transmission of data packets and transmission of voice signals in cellular communication. Finally, there is a need for providing user prompts to enable efficient use of a communication device capable of transmitting and receiving both voice and data.

BRIEF DESCRIPTION OF THE DRAWINGS

FIG. 6 is a flow chart showing additional features of a communication device adapted to process voice and data.

DESCRIPTION OF THE PREFERRED EMBODIMENT

Wireless communication systems have not only increased in popularity, but also in functionality. In addition to voice communication capability, wireless communication devices can transmit data messages by way of data packets. Excess channel capacity on existing cellular telephone systems provides a convenient opportunity for data packet transmission. The method and apparatus of the present invention automatically switches between the transmission of data packets and transmission of voice signals in cellular communication. In particular, the method and apparatus increases efficient use of channel capacity by selectively switching between systems during periods of non-use. Finally, according to other novel aspects of the present invention, user prompts enable efficient use of a communication device capable of transmitting and receiving both voice and data.

Figure 1:
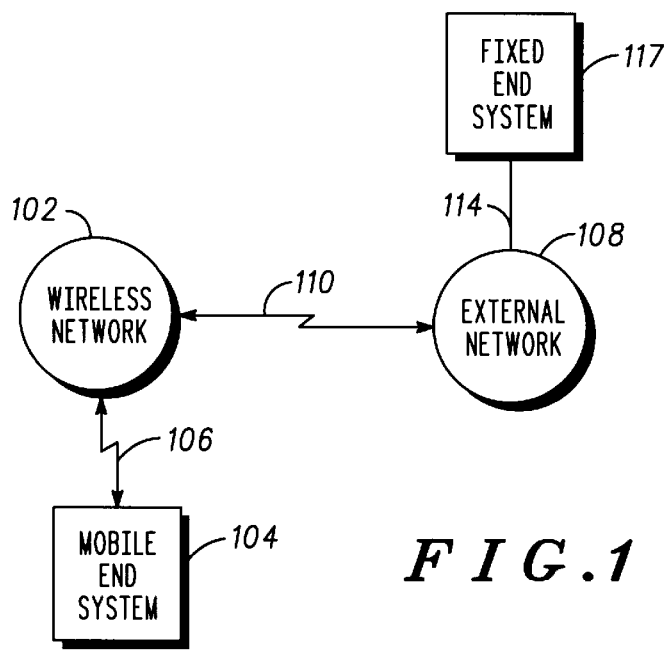
FIG. 1 is a block diagram of a network for transmitting signals and data between wireless communication systems and fixed end systems incorporating a mobile end system of the present invention.

Turning first to FIG. 1, a communication network 100 for incorporating the mobile end system of the present invention is shown. The communication network is adapted to transmit data and other signals between wireless networks, such as a cellular telephone network, and conventional landline networks, such a public system telephone network (PSTN) coupled to a computer network. In particular, a wireless network 102 is shown coupled to receive radio frequency (RF) signals from a mobile end system 104, such as a mobile or portable cellular radiotelephone or other wireless communication device, by way of an RF link 106. The wireless network 102 is also coupled to an external network 108, such as a public system telephone network by way of a communication link 110. The communication link could be a wireless link, or could be provided by a physical connection between the wireless network and the external network. The external networks are coupled to a fixed end system by way of existing infrastructure.

While the communication network of FIG. 1 shows the transmission of signals between a mobile end system and fixed end system by way of example, the present invention could also apply to communication between two mobile end systems coupled to the wireless network, for example. The present invention also could be employed in any wireless communication environment, such as paging, Personal Communication Services (PCS) or satellite communication services.

Figure 2:
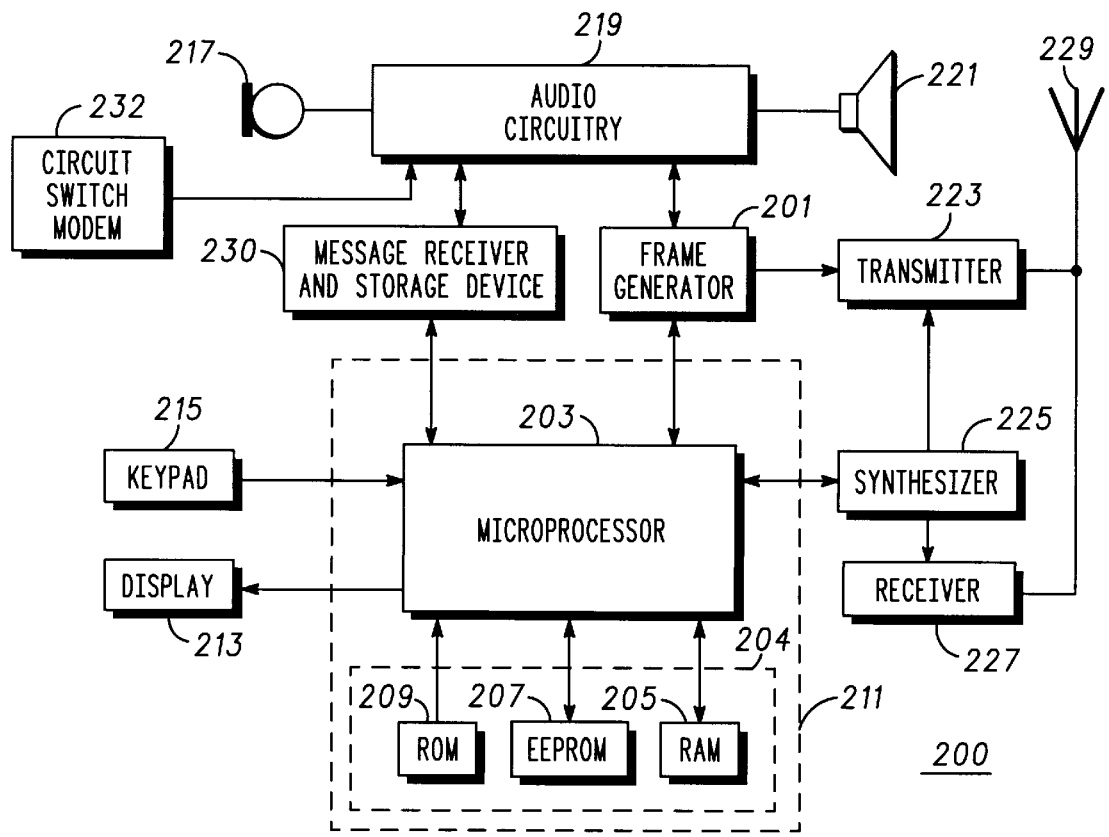
FIG. 2 is a block diagram of a wireless communication device having digital packet data capability according to the present invention.

Turning now to FIG. 2, a block diagram of a wireless communication device such as a cellular radiotelephone incorporating the present invention is shown. In the preferred embodiment, a frame generator ASIC (Application Specific Integrated Circuit) 201, such as a CMOS ASIC available from Motorola, Inc. and a microprocessor 203, such as a 68HC11 microprocessor also available from Motorola, Inc., combine to generate the necessary communication protocol for operating in a cellular system. Microprocessor 203 uses RAM 205, EEPROM 207, and ROM 209, preferably consolidated in one package 211, to execute the steps necessary to generate the protocol and to perform other functions for the communication unit, such as writing to a display 213, accepting information from a keypad 215, and controlling a frequency synthesizer 225. ASIC 201 processes audio transformed by audio circuitry 219 from a microphone 217 and to a speaker 221. A transceiver processes the radio frequency signals. In particular, a transmitter 223 transmits through an antenna 229 using carrier frequencies produced by a frequency synthesizer 225. Information received by the communication device's antenna 229 enters receiver 227 which demodulates the symbols comprising the message frame using the carrier frequencies from frequency synthesizer 225.

The communication device may optionally include a message receiver and storage device including digital signal processing means. The message receiver and storage device could be, for example, a digital answering machine or a paging receiver. Finally, the communication device may include a circuit switch modem 232. Circuit switch modems are well known to those skilled in the art of telecommunications.

Figure 3:
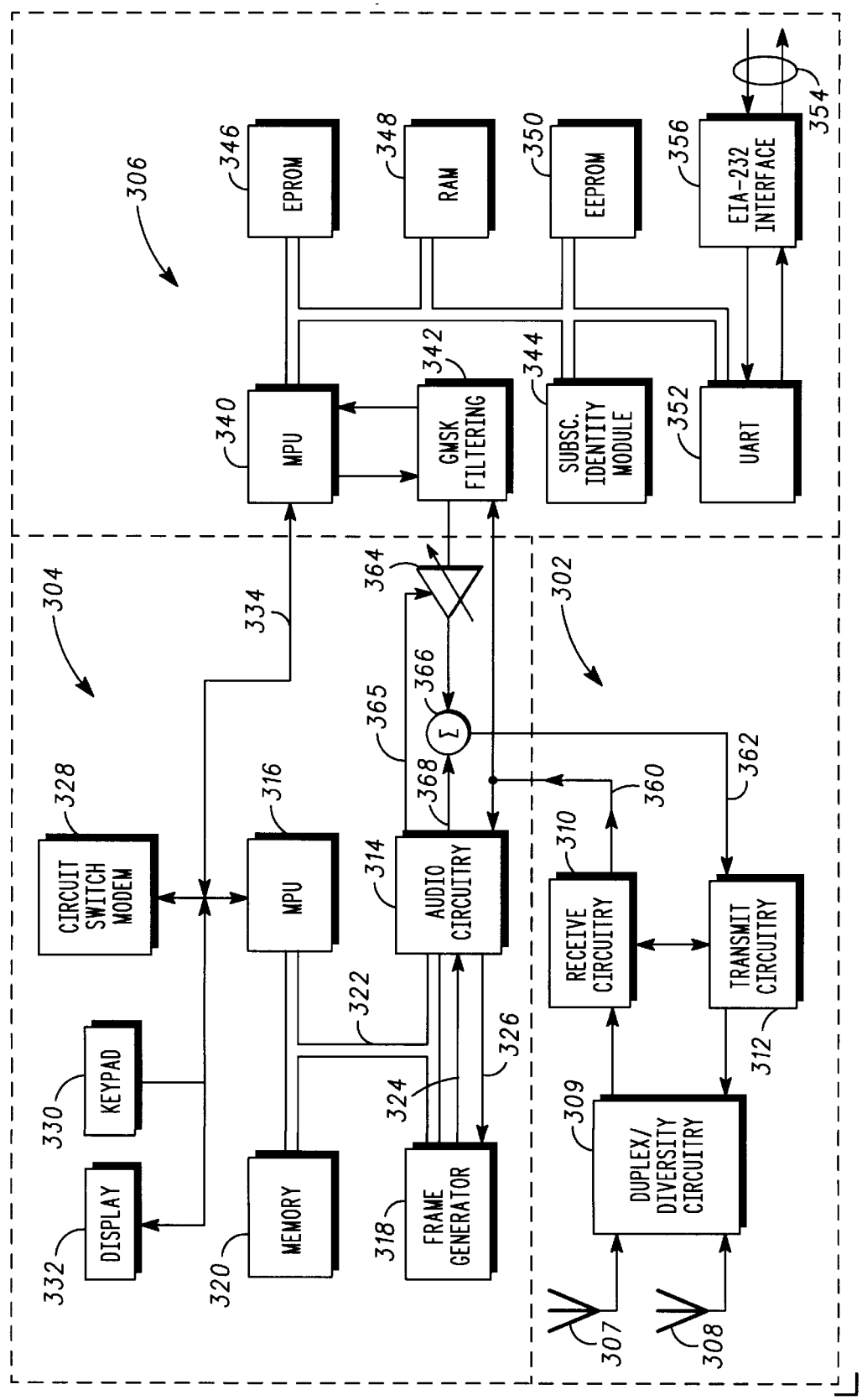
FIG. 3 is a detailed block diagram of the wireless communication device shown in FIG. 2.

Turning now to FIG. 3, a detailed block diagram of a wireless communication device incorporating the present invention is shown. The wireless communication device includes radio frequency (RF) circuitry 302, logic or control circuitry 304, and modulation/demodulation (modem) circuitry 306. RF circuitry 302 includes antennae 307 and 308 which are coupled to duplex/diversity circuitry 309. Duplex/diversity circuitry 309 is coupled to receive circuitry 310 to couple signals to logic circuitry 304 or modem circuitry 306. Duplex/diversity circuitry 309 is also coupled to transmit circuitry 312 for receiving signals from logic circuitry 304 or modem circuitry 306. Transmit circuitry 312 couples these signals to the duplex/diversity circuitry 309 for transmission by way of one of the antennae 307 or 308.

Logic circuitry 304 includes audio circuitry 314, microprocessor 316, frame generator 318 and memory 320. These elements of logic circuitry 304 are interconnected via a logic bus 322. The frame generator and the audio circuitry are also connected via lines 324 and 326. Finally, the microprocessor is also coupled to circuit switch modem 328, keypad 330, and display 332 by bus 334.

Data packet circuitry 306 comprises a microprocessor 340, GMSK filtering circuitry 342, a Subscriber Identity Module (SIM) 344, and memory elements including an EPROM 346, a RAM 348, and an EEPROM 350. Microprocessor 340 can communicate with microprocessor 203 of the logic circuitry by way of a high speed serial bus. A UART 352 enables communication with an external port 354 by way of an EIA-232 interface 356. Receive circuitry 310 transmits signals to the audio circuitry 314 and modem circuitry 306 by way of line 360. Transmit circuitry 312 receives signals from audio circuitry 306 and from modem circuitry 306 by way of line 362. An attenuator 364, which is controlled by the audio circuitry 314 by way of line 365, attenuates signals from modem circuitry 310 to be transmitted to transmit circuitry 312 by way of a summing circuit 366. Alternatively, attenuator circuit 364 could be a switch which blocks signals from modem 306. Also, a second switch could be inserted in a line 368 to block signals from audio circuitry 314, or a single switch could be employed to select signals from either the logic circuitry or the modem circuitry. Summing circuit 366 enables signals from both logic circuitry 304 and modem circuit 306 to be sent to transmit circuitry 312.

When transmitting signals from the logic circuitry to the RF circuitry, signals from the modem are attenuated by attenuator 364. Therefore, when the signals from modem 306 are attenuated, signals from summary circuit 366 on line 362 comprise signals only from the logic circuitry. When transmitting signals from modem circuit 306, audio circuitry 314 mutes any audio signals from logic circuitry 304, and minimizes attenuation from the modem. Therefore, signals from summary circuit 366 on line 362 comprise signals only from the modem.

The block diagram of the circuit of FIG. 3 includes RF circuitry 302, logic circuitry 304 and modem circuitry 306 partitioned as modules. Such partitions are merely shown by way of example, and are not intended as limitations of the present invention. Elements of one module could be placed in another module, redundant elements could be eliminated, or the modules could be combined into a single module. For example, a single microprocessor could replace microprocessors 316 and 340. Although attenuator 364 is shown as a part of logic circuit 304, attenuator 368 could be incorporated in modem 306. Finally, attenuator 364 and summary circuit 366 could be replaced by separate lines form each of audio circuitry 314 and GMSK modulator/demodulator circuitry 342 to receive circuitry 310 and transmit circuitry 312. Other modifications to the circuit of FIG. 3 could be made within the spirit and scope of the present invention.

Figure 4:
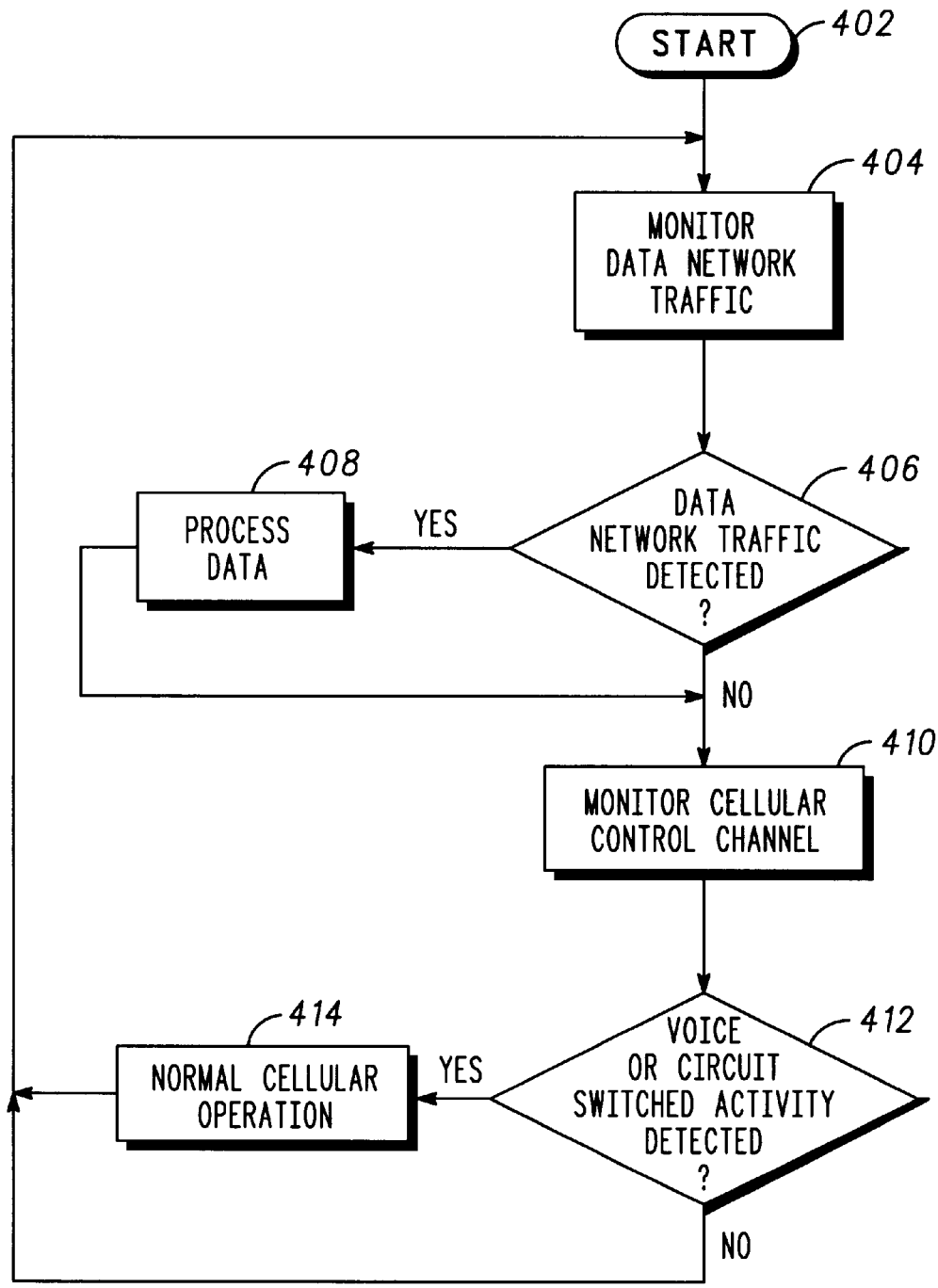
FIG. 4 is a flow chart showing a method for operating the wireless communication device of FIG. 3.

Turning now to FIG. 4, a flow chart shows a method for operating the wireless communication device of FIG. 2. The communication device monitors data network traffic at step 404, and determines whether data network traffic is detected at step 406. If data is detected, the data is processed at a step 408. After processing the data, or if no data is detected, the communication device monitors cellular control channels at a step 410. At a step 412, it is determined whether voice or circuit switched activity is detected. If activity is detected, normal cellular operation takes place at a step 414. If no activity is detected or after normal cellular operation, the communication device monitors data network traffic at step 404.

Figure 5:
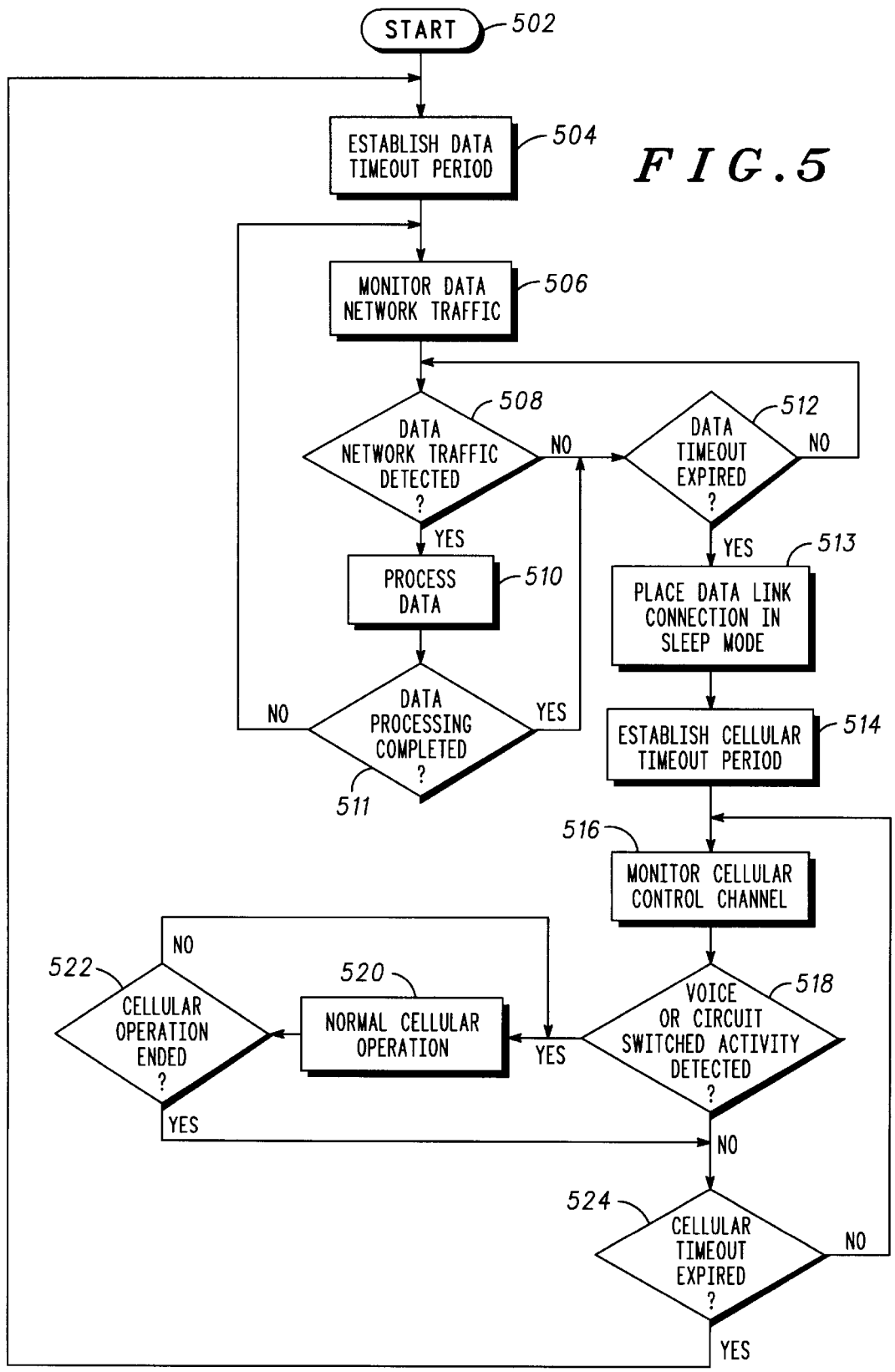
FIG. 5 is a detailed flow chart showing the operation of the wireless communication device of FIG. 3.

Turning now to FIG. 5, a more detailed flow chart shows additional novel features for operating the wireless communication device of FIG. 2 according to the present invention. At step 502, a data link connection is established between the communication device and the data network. At a step 504, the communication device establishes a data timeout. Such a data time-out can be employed in data networks having an optional sleep mode. A sleep mode is intended to assist power conservation by disabling or powering down a receiver and its associated circuitry. The sleep mode option may be requested by the communication device during data link establishment. The sleep mode procedures of the CDPD network, for example, can be found in Section 6.8 of the earlier cited CDPD Specification, Release 1.1 (Jan. 19, 1995).

The communication device then monitors data network traffic at a step 506. At a step 508, the communication device determines whether data network traffic is detected. If data network traffic is detected, the data is processed at a step 510. The network device then determines whether the processing is completed at a step 511. If the processing is not completed, the communication device monitors data traffic at step 506. If no data traffic is detected, or if the processing is completed, the communication device determines whether the data time-out has expired at step 512. If the time-out has not expired, the communication device determines whether data network traffic is again detected at step 508.

When the data time-out expires at 512, the data link connection is placed in a sleep mode and the communication device establishes a cellular time-out at a step 514. The cellular time-out represents the duration of this sleep mode of the data network. Because no data will be received when the data link is placed in a sleep mode, the communication device automatically monitors the cellular control channel at a step 516. The communication device determines whether voice or circuit switch modem activity is detected at a step 518. If activity is detected, normal cellular operation takes place at step 520. The communication device determines whether the cellular operation has ended at a step 522. Because data transmission can be transmitted periodically, cellular operation preferably takes priority over any data operations. After normal cellular operation has ended, the communication device determines whether the cellular time-out has expired at a step 524. If the cellular time-out has not expired, the communication device monitors cellular control channel at step 516. If the cellular time-out has expired at step 524, the communication device establishes a data time-out at step 504 and monitors data network traffic at step 506.

Turning now to FIG. 6, a flow chart shows additional features of a communication device adapted to process voice and data. Because some users of a device may rely more heavily on either voice or data, it may beneficial to select one mode and remain in that mode. However, selecting a single mode will preclude receiving a message in the other mode. The method of FIG. 6 provides greater flexibility for a user to select a certain mode and receive an alert in the selected mode that a message is ready to be transmitted in the other mode.

In particular, at a step 604, the user selects the cellular voice mode or a data mode, such as CDPD data mode. At a step 606, the communication device determines whether the cellular voice mode is selected. If the cellular voice mode is not selected, the data mode is selected and the communication device determines whether the incoming data message requests the voice mode at a step 606. If the data message does not request the voice mode, the communication device continues to monitor network traffic at a step 608 and processes any data at step 610. If the incoming message requests the voice mode at a step 606, the user sends a signal on the data network acknowledging the request at a step 612. The user than switches to the cellular voice mode at a step 614 for normal cellular operation at a step 616.

If the cellular voice mode is selected at step 606, the user determines whether an incoming message requesting the data mode is received. Such a message could be sent as an overhead message and output on the display of the communication device, or some other audible or visual display. If no message is received at step 618, the user continues normal cellular voice operation at step 624. If the user receives a request for the data mode, the user acknowledges the request at a step 620 and switches to the data mode at step 622. In addition to application to CDPD, the methods of FIG. 6 could also be employed on other cellular data networks, such as the NAMPS system. The NAMPS system is well known in the art and supports short messaging capability. Also, for two line capability, a user could place a voice call on hold to receive a data message rather than terminating the voice call.

In summary, excess channel capacity on existing cellular telephone systems, at off-peak periods, or during other periods of channel non-use, such as during a handoff, provides a convenient opportunity for data packet transmission. The method and apparatus of the present invention automatically switches between transmission of voice signals and the transmission of data packets. In particular, the method and apparatus increases efficient use of channel capacity by selectively switching between systems during periods of non-use. Finally, according to other novel aspects of the present invention, user prompts enable efficient use of a communication device capable of transmitting and receiving both voice and data signals. While the specific implementations of the present invention are described above, variations and modifications could be made by one skilled in the art within the spirit and scope of the present invention. The present invention should be limited only by the appended claims.

We claim:

1. A method for operating a wireless communication device adapted to operate in one of two modes, said method comprising the steps of:

monitoring a data network for data traffic during a first predetermined period of time;

determining during said first predetermined period of time whether any data traffic is detected;

processing data when data traffic is detected during said first predetermined period of time;

monitoring a cellular control channel for cellular traffic during a second predetermined period of time after processing data or when no data traffic is detected during said first predetermined period of time;

determining during said second predetermined period of time whether any cellular traffic is detected; and establishing normal cellular operation when cellular traffic is detected; and monitoring said data network during said first predetermined period if no cellular traffic is detected.

2. The method for operating a wireless communication device according to claim 1 further comprising a step of establishing a data link connection between said wireless communication device and a data network.

3. The method for operating a wireless communication device according to claim 2 further comprising a step of placing said data link connection in a sleep mode at the end of said first predetermined period of time.

4. The method for operating a wireless communication device according to claim 1 wherein said step of processing data comprises modulating and demodulating data using GMSK modulation.

5. The method for operating a wireless communication device according to claim 1 wherein said step of establishing normal cellular operation comprises continuing normal cellular operation until said normal cellular operation is terminated.

6. The method for operating a wireless communication device according to claim 5 further including a step of monitoring said data network after said normal cellular operation is terminated.

7. A method for operating a wireless communication device adapted to operate in a voice mode and a data mode, said method comprising the steps of:

establishing a data link connection between said wireless communication device and a data network;

monitoring a data network for data traffic during a first predetermined period of time;

determining during said first predetermined period of time whether any data traffic is detected;

processing data when data traffic is detected during said first predetermined period of time;

placing said data link connection in a sleep mode at the end of said first predetermined period of time;

monitoring a cellular control channel for cellular traffic during a second predetermined period of time after processing data or when no data traffic is detected during said first predetermined period of time;

determining during said second predetermined period of time whether any cellular traffic is detected;

establishing normal cellular communication when cellular traffic activity is detected; and monitoring said data network during said first predetermined period if no cellular traffic is detected.

8. The method for operating a wireless communication device according to claim 7 wherein said step of processing data comprises modulating and demodulating data using GMSK modulation.

9. The method for operating a wireless communication device according to claim 7 further including a step of monitoring said data network after said normal cellular communication is terminated.

10. A method for operating a cellular radiotelephone adapted to transmit and receive communication signals in a first mode of operation, and transmit and receive data signals in second mode of operation, said method comprising the steps of:

monitoring a data network for said data signals during a first predetermined period;

determining during said first predetermined period whether any data signals are received;

processing said data signals when data signals are received during said first predetermined period;

monitoring a cellular control channel for said communication signals during a second predetermined period after processing said data signals or when no data signals are received during said first predetermined period;

performing normal cellular operation when said communication signals are received; and monitoring said data network during said first predetermined period if no said communication signals are detected.

11. A method for operating a cellular radiotelephone adapted to operate in a voice mode and a cellular digital data packet mode, said method comprising the steps of:

establishing a data link connection between said cellular radiotelephone and a data network;

monitoring a data network for data traffic during a first predetermined period of time;

determining during said first predetermined period of time whether any data traffic is detected;

modulating and demodulating data when data traffic is detected during said first predetermined period of time using GMSK modulation;

placing said data link connection in a sleep mode at the end of said first predetermined period of time;

monitoring a cellular control channel for cellular traffic during a second predetermined period of time after modulating and demodulating data or when no data traffic is detected during said first predetermined period of time;

determining during said second predetermined period of time whether any cellular traffic is detected;

establishing normal cellular communication when cellular traffic is detected; and monitoring said data network for data traffic during said first predetermined period of time after said normal cellular communication.

* * * * *